(12) United States Patent
Kar et al.

(10) Patent No.: US 9,978,397 B2
(45) Date of Patent: May 22, 2018

(54) WEARER VOICE ACTIVITY DETECTION

(71) Applicant: Intel Corporation, Santa Clara, CA (US)

(72) Inventors: Swarnendu Kar, Hillsboro, OR (US); Gauri Phatak, Portland, OR (US); Saurin Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/978,015

(22) Filed: Dec. 22, 2015

(65) Prior Publication Data
US 2017/0178668 A1 Jun. 22, 2017

(51) Int. Cl.
| | |
|---|---|
| *G10L 25/78* | (2013.01) |
| *G10L 17/18* | (2013.01) |
| *G10L 17/02* | (2013.01) |
| *G10L 21/0232* | (2013.01) |

(52) U.S. Cl.
CPC .............. *G10L 25/78* (2013.01); *G10L 17/02* (2013.01); *G10L 17/18* (2013.01); *G10L 21/0232* (2013.01)

(58) Field of Classification Search
CPC ........................................................ G10L 25/78
See application file for complete search history.

(56) References Cited

U.S. PATENT DOCUMENTS

| | | | |
|---|---|---|---|
| 7,254,538 B1 | 8/2007 | Hermansky et al. | |
| 7,590,529 B2 * | 9/2009 | Zhang .................. | G10L 21/0208 704/226 |
| 8,625,819 B2 | 1/2014 | Goldstein et al. | |
| 8,873,779 B2 | 10/2014 | Lugger | |
| 9,094,749 B2 | 7/2015 | Xie et al. | |
| 9,135,915 B1 * | 9/2015 | Johnson .................. | G10L 15/26 |
| 2004/0267521 A1 * | 12/2004 | Cutler ..................... | G10L 15/25 704/202 |
| 2005/0033571 A1 * | 2/2005 | Huang .................... | G10L 15/20 704/231 |
| 2008/0260180 A1 * | 10/2008 | Goldstein .............. | H04R 25/50 381/110 |
| 2011/0010172 A1 * | 1/2011 | Konchitsky ............. | G10L 15/24 704/233 |

(Continued)

FOREIGN PATENT DOCUMENTS

| | | |
|---|---|---|
| WO | WO 2008128173 | 10/2008 |
| WO | 2017112200 A1 | 6/2017 |

OTHER PUBLICATIONS

"Multi-Sensory Microphones for Robust Speech Detection, Enhancement and Recognition," Zhang, et al., Microsoft Research, Nov. 22, 2003, 4 pages.

(Continued)

*Primary Examiner* — Douglas Godbold
(74) *Attorney, Agent, or Firm* — Patent Capital Group (57) ABSTRACT

Embodiments include a wearable device, such as a head-worn device. The wearable device includes a first microphone to receive a first sound signal from a wearer of the wearable device; a second microphone to receive a second sound signal from the wearer of the wearable device; and a processor to process the first sound signals and the second sound signals to determine that the first and second sound signals originate from the wearer of the wearable device.

25 Claims, 4 Drawing Sheets

(56) References Cited

U.S. PATENT DOCUMENTS

| | | | |
|---|---|---|---|
| 2011/0208520 A1* | 8/2011 | Lee | G10L 25/78 704/233 |
| 2012/0230526 A1 | 9/2012 | Zhang | |
| 2013/0263284 A1 | 10/2013 | Black et al. | |
| 2014/0010397 A1 | 1/2014 | Merks | |
| 2014/0081644 A1* | 3/2014 | Usher | H04R 25/50 704/275 |
| 2014/0095157 A1* | 4/2014 | Usher | H04R 25/50 704/233 |
| 2014/0337036 A1* | 11/2014 | Haiut | G06F 1/3265 704/275 |
| 2015/0179189 A1 | 6/2015 | Dadu et al. | |
| 2015/0356981 A1* | 12/2015 | Johnson | G10L 15/26 704/231 |
| 2016/0093313 A1* | 3/2016 | Vickers | G10L 25/78 704/232 |

OTHER PUBLICATIONS

International Search Report and Written Opinion in International Patent Application PCT/US2016/062970 dated Mar. 10, 2017.

* cited by examiner

FIG. 4

WEARER VOICE ACTIVITY DETECTION

TECHNICAL FIELD

This disclosure pertains to wearer voice activity detection, and in particularly, to wearer voice activity detection using bimodal microphones.

BACKGROUND

Single modal microphones for device-based speech recognition and dialog systems provide a way for a user to interact with a wearable device. Single modal microphones allow for a user to provide instructions to a wearable device to elicit responses, such as directions, information, responses to queries, confirmations of command executions, etc.

DETAILED DESCRIPTION

This disclosure describes a wearable device, such as a head-worn device that includes two microphones. The use of two microphones can be used to clarify the originator of speech input to a dialog system. Though a single modality (either air or bone-conduction) by itself is not sufficiently reliable for achieving wearer voice activity detection (VAD), having two modalities simultaneously changes the way VAD is processed. The relative transfer function (between the two modes) has enough information to make a distinction between wearer speaking and ambient audio.

This disclosure describes wearable devices such as glasses/earphones with audio based command/control interface. Such a device uses voice commands for various purposes like navigation, browsing calendars, setting alarms and web search. One problem with these devices is that the source of audio cannot easily be ascertained as coming from the wearer of the device. For example, when Person-A wears a Google glass and Person-B says "ok google", the device still unlocks, which is clearly not desirable. This disclosure addresses this problem by using a combination of hardware and software referred to herein as wearer voice activity detection (wearer VAD), which uses bimodal microphone signal to figure out whether the wearer is speaking or not. By bimodal, we mean a combination of an air microphone (the ordinary kind) and another microphone where the audio signal is transmitted through a non-air medium (example, bone conduction or in-ear mics).

In particular, this disclosure describes:

1) Capture and fusion of two different audio modalities on a wearable audio device; and 2) Software that harnesses the difference of modalities to compute a wearer voice activity indicator.

Potential uses of wearer VAD extend well beyond unlocking a device or triggering a conversation—it can help with traditionally difficult audio processing tasks like noise reduction, speech enhancement and speech separation.

In this disclosure, a mode of a microphone can be defined as the medium in which sound is captured. Examples include bone conduction microphones, in-ear microphones, both of which use the vibration through a skull and ear-canal respectively as the medium of transfer of sound. Air microphones use air as the medium of transfer.

Audio captured simultaneously through two different modes jointly carries definitive evidence of wearer voice activity. The term "wearer" is used to mean any user wearing that particular device and no user-specific pre-registration is involved.

Sound produced by human beings is based on the shape of their vocal tracts and differs widely in frequency content as a result. Audio transmitted through non-air media (bone/in-ear) undergoes frequency distortion vis-à-vis the original signal.

By having two different modes of simultaneous capture, we can compute the intermodal relation between the signals, which happens to carry enough information to make a distinction. In other words, the absolute frequency content is not important in this case, it is the relative transfer function that provides the information for wearer VAD. When the source of sound is in the background, the two modalities of signal appear more identical in its frequency characteristics.

However, when the source of sound is the wearer, some frequencies in the bone conduction transmission are attenuated drastically, leading to a less identical appearance in some frequency bands. This distinction is what makes wearer VAD possible.

This disclosure makes use of multimodal microphones and can be used on any head mounted wearable where the device is in contact with the person's nose, throat, skull or ear canal, e.g. Glasses, headbands, earphones, helmets, headphones.

This is to facilitate the use of either bone conduction or in-ear microphones. At least one of these types of microphones is required in addition to an ordinary air microphone for embodiments of the disclosure to work.

The algorithm for wearer VAD is based on making a binary decision on whether the source of sound is the wearer or something in the background. A binary classifier uses information contained in the relative transfer function between the two modalities of signal, e.g., bone-conduction and ordinary air microphones. The idea is that when the source of sound is in the background, the two modalities of signal appear more identical in its frequency characteristics. However, when the source of sound is the wearer, some frequencies in the bone-conduction transmission are attenuated drastically, leading to a less identical appearance in some frequency bands. This difference in relative transfer function is learnt by extracting several features in individual frequency sub-bands and performing a Neural network classification that is trained on data collected from a diverse population.

The Neural Network can be trained to differentiate between 2 situations—A) wearer is speaking (voice) and B) someone else is speaking (background). Audio can be collected from 16 different male and female subjects with different accents and voice kinds. For voice data, each subject was asked to utter a few phrases in both dialog and conversational mode. For background data, each subject was made to sit quiet wearing the device while an audio clip containing several phrases in dialog and conversational modes was played in the background at different intensity levels. In the testing, the training based on 16 subjects proved to be sufficiently robust and works for new and different test subjects.

Figure 1:
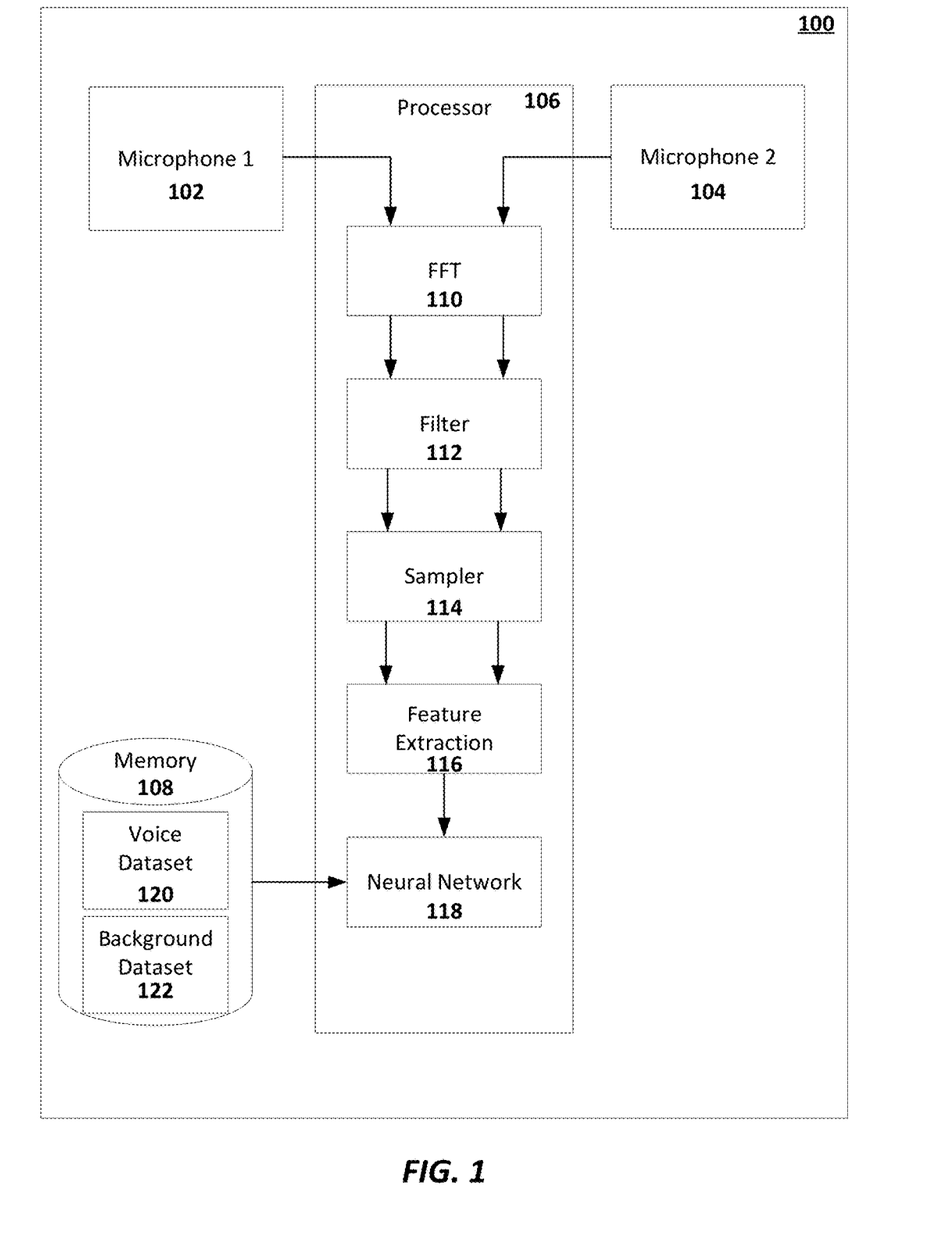
FIG. 1 is a schematic block diagram of a wearable device that includes bimodal microphones.

FIG. 1 is a schematic block diagram of a wearable device 100 that includes bimodal microphones. Wearable device 100 may be a pair of smart glasses and earphones with audio based command/control interface, a helmet, earbuds. The wearable device 100 includes a first microphone 102 and a second microphone 104. The first microphone 102 and the second microphone 104 can be different modes. For example, the first microphone 102 can be an air microphone, while the second microphone 104 can be a bone conduction microphone or in-ear microphone. In some embodiments a third microphone can be used to encompass three types of modes. The first microphone 102 can receive a sound signal at the same time as the second microphone 104. The first microphone 102 can provide a first sound signal representative of the received sound signal to a processor 106. The second microphone 104 can provide a second sound signal representative of the received sound signal to the processor 106. The processor 106 can process the first and second sound signals to determine an originator of the received sound signal.

The processor can use a fast Fourier transform (FFT) 110 to filter the first and second sound signals in the frequency domain. Other filtering can be performed to reduce noise, etc. using filtering logic 112. The first and second sound signals can be sampled using a sampler 114. Features can be extracted using a feature extraction module 116. The extracted features are fused and provided to a neural network 118.

The wearable device 100 also includes a memory 108. Memory 108 includes a voice dataset 120 and a background dataset 122. The voice dataset 120 and the background dataset 122 are preprogrammed into the wearable device 100 and are the result of training the neural network.

Figure 2:
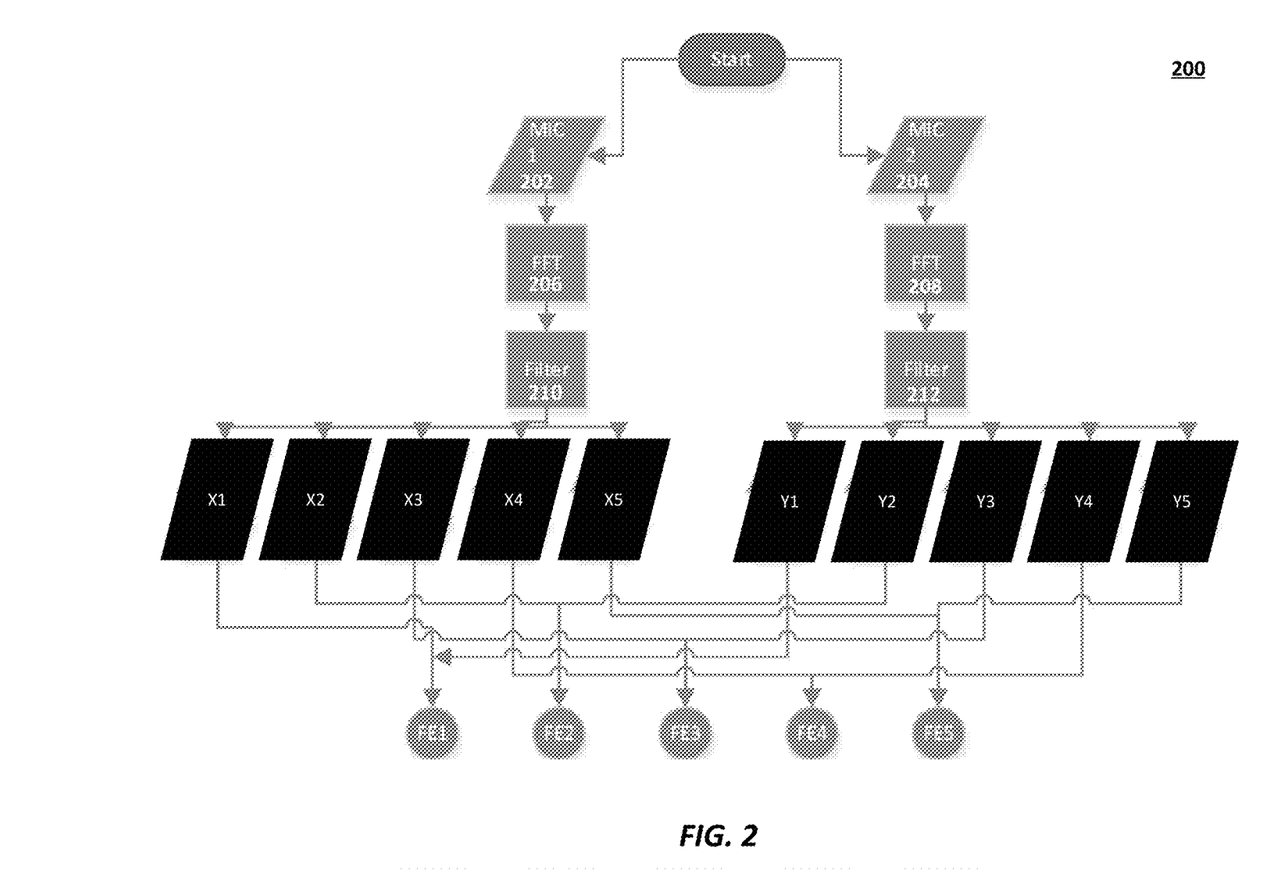
FIG. 2 is a schematic block diagram of processing inputs from each of two microphones.

FIG. 2 is a schematic block diagram 200 of processing inputs from each of two microphones. FIG. 2 describes the feature extraction part of the algorithm. Mic 1 202 and Mic 2 204 receive a sound signal at substantially the same time. Audio from both the modalities are filtered by a fast Fourier transfer (FFT) 206 and FFT 208, respectively; each audio signal can undergo additional filtering 210 and 212. Each audio signal is subsampled based on 5 uniformly spaced bands between 400 Hz and 3200 Hz. For mic 1 202, the audio signal can be subsampled into five 16 millisecond frames X1, X2, X3, X4, and X5 to facilitate audio analysis. For mic 2 204, the audio signal can be subsampled into five 16 millisecond frames Y1, Y2, Y3, Y4, and Y5 to facilitate audio analysis. Frames from each subband-pair are fused to extract certain features such as energy ratio, mutual entropy, and correlation. For example, the data from corresponding subband frames from each microphone are combined to calculate each feature for those frames. Features from all 5 subband-pairs are concatenated to form feature vectors FE1, FE2, FE3, FE4, and FE5. For each pair of subbands, features are extracted from each audio signal, for a total of 15 features (e.g., 3 features per subband). FE1, therefore, is a concatenation of features from X1 and features from Y1, which forms the feature vector F1={gain (X1,Y1), entropy (X1,Y1), correlation (X1,Y1)}. F1, thus, has three values, each value representing a feature of the audio signal for each mode at a subband. The feature vectors FE1-FE5 form the input to the neural network shown in FIG. 3.

Figure 3:
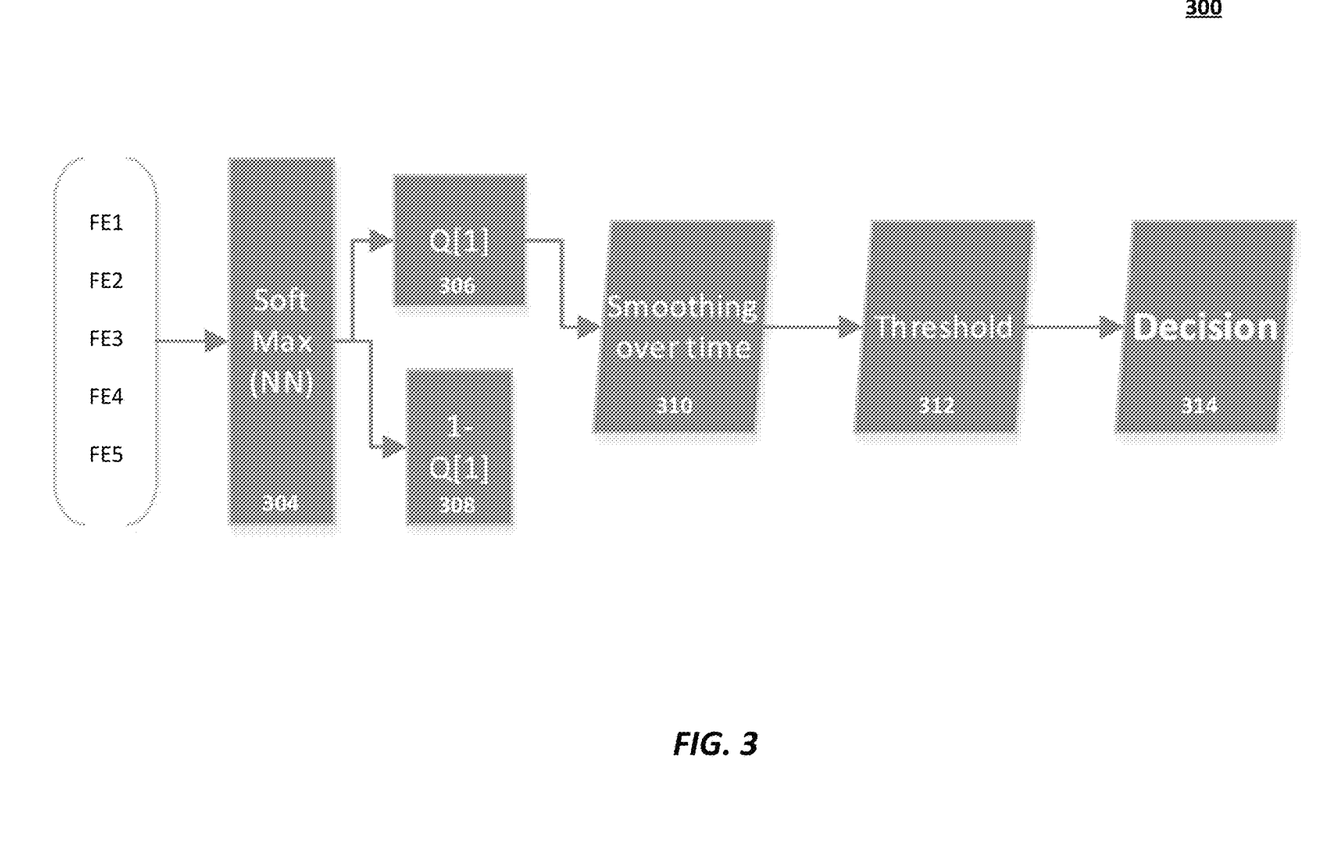
FIG. 3 is a schematic block diagram of using bimodal inputs to determine an origination of speech.

FIG. 3 is a schematic block diagram 300 of using extracted features from bimodal microphone signals to determine an origination of audio signals. FIG. 3 describes the classification algorithm and structural features for determining whether the audio signal originates from the wearer. The feature vectors FE1-FE5 are fed to a trained neural network 304 that is pre-trained with a diverse voice and background dataset (e.g., voice dataset 120 and background dataset 122 stored in memory 108 in FIG. 1. The neural network 304 is a system of non-linear functions, which are applies to the feature vectors FE1-FE5. The neural network 304 operates on each of the feature vector values. The neural network 304 outputs a voice probability Q[1] 306 that represents the probability that the audio signal originates from the wearer of the wearable device. Another output 1-Q[1] 308 can represent the probability that the audio signal originates as background noise.

The neural network 304 can include weighted rules that the neural network 304 applies to the feature vectors FE1-FE5. The neural network 304 is trained using example data prior to being worn by the wearer. The training can include using speech patterns from a variety of speakers wearing a wearable device that includes two modes of microphones. As an example, when the audio signal originates from the wearer of the wearable device, there is a high correlation between the audio signals from each microphone at high frequencies. When the audio signal originates from a non-wearer, there is a high correlation between audio signals from each microphone in all frequencies. The neural network 304 applies the set of weighted rules to the feature vectors to provide the probability output.

In some implementations, a soft max function is applied to the output of the neural network 304 to accentuate the winning decision and convert scores to class-probabilities that add to 1 (e.g., Q[1] 306 and 1-Q[1] 308). Since each frame is 16 milliseconds long, 60 probability values for each class per second can be generated. Q[1] 306 can be considered the wearer's voice probability. The probability of voice Q[1] 306 is further smoothed over time to get rid of spurious decisions (310). A threshold 312 is subsequently applied to make a final decision 314. For example, if the probability Q[1] is greater than a predetermined threshold (e.g., a threshold value determined during training), the wearable device can determine that the audio signal is the voice of the wearer. The wearable device can then provide the audio signal to a dialog engine or other features of the wearable device.

In some cases, the wearable device can determine based on the probability threshold 312 that the audio signal does not originate from the wearer, in which case the wearable device can discard the audio signal or request clarification from the wearer as to whether the wearer is attempting to communicate with the wearable device.

Figure 4:
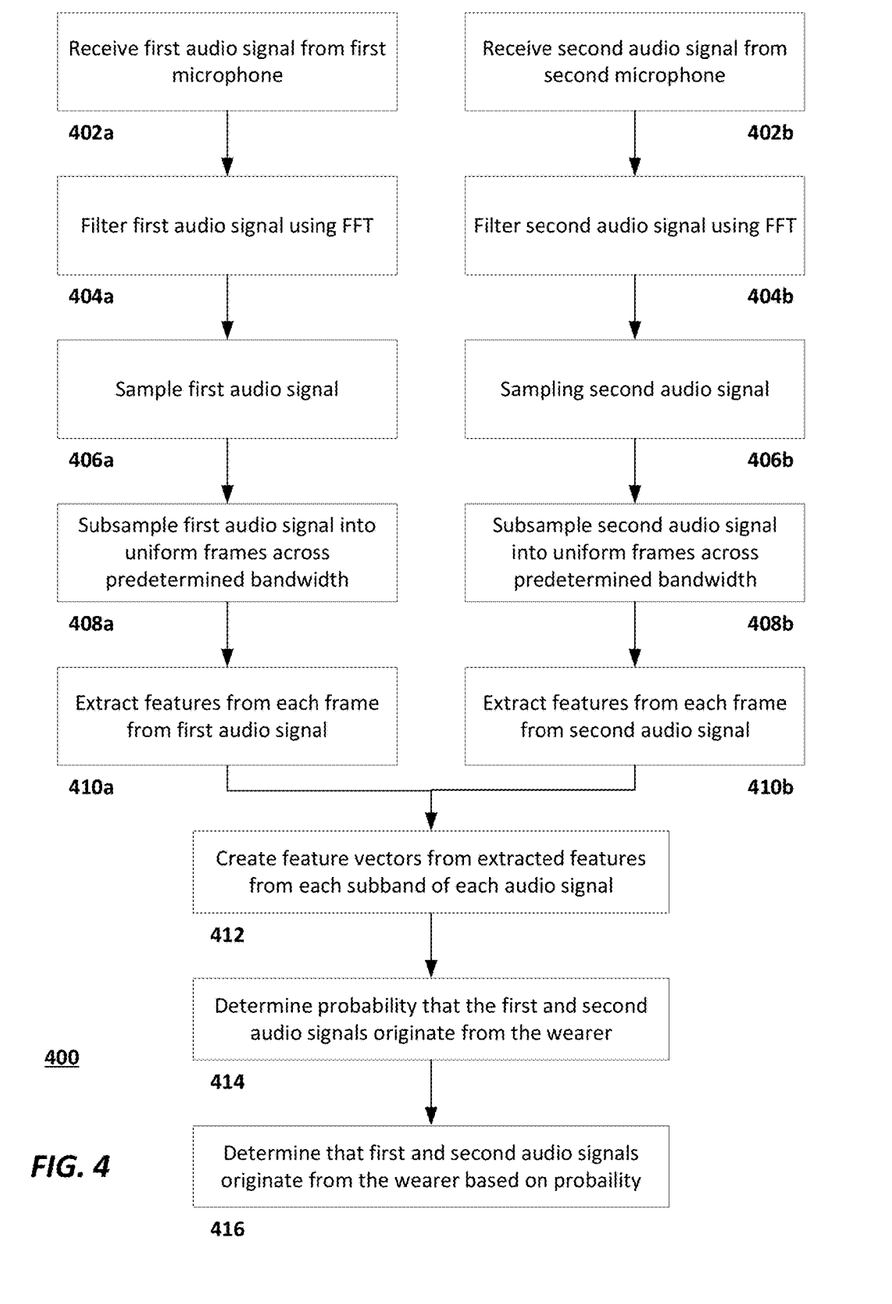
FIG. 4 is a process flow diagram for processing bimodal inputs.

FIG. 4 is a process flow diagram 400 for processing bimodal inputs. A first audio signal is received at a first microphone (402a). A second audio signal is received at a second microphone (402b). The first and second audio signals are from the same source at the same time. The first and second audio signals can be received from each microphone substantially simultaneously. The first audio signal can be filtered using FFT (404a). The second audio signal can be filtered using FFT (404b). The first audio signal can be sampled (406a). The second audio signal can be sampled (406b). The sampling can be performed at 8 kHz, for example. The first audio signal can be subsampled based on 5 uniformly spaced bands between 400 Hz and 3200 Hz (408a). The second audio signal can be subsampled based on 5 uniformly spaced bands between 400 Hz and 3200 Hz (408b).

Features can be extracted from each frame of the subsampled first audio signal (410a). Features can also be extracted from each frame of the subsampled first audio signal (410b). Feature vectors can be created using the extracted features (412). The feature vectors can be processed using a neural network (414). The neural network can output a probability of whether the audio signal originated from the based on the feature vectors. The probability can be compared to a threshold level to conclude whether the audio signal originates from the wearer of the wearable device or from background signals/noise (416).

Example 1 is a wearable device that includes a first microphone to receive a first sound signal from a wearer of the wearable device; a second microphone to receive a second sound signal from the wearer of the wearable device; a processor to process the first sound signals and the second sound signals to determine that the first and second sound signals originate from the wearer of the wearable device.

Example 2 may include the subject matter of example 1, wherein the first microphone comprises an air microphone.

Example 3 may include the subject matter of any of examples 1 or 2, wherein the second microphone comprises one of a bone conduction microphone or an in-ear microphone.

Example 4 may include the subject matter of any of examples 1 or 2 or 3, wherein the processor is configured to process the first sound signal and the second sound signal by sampling the first sound signal and the second sound signal; extracting one or more features from the first sound signal and from the second sound signal; and determining that the first and second sound signals originate from the wearer by comparing extracted features from the first sound signal and from the second sound signal.

Example 5 may include the subject matter of any of claim 1 or 4, further comprising a neural network to process extracted features from each of the first sound signal and from the second sound signal.

Example 6 may include the subject matter of example 5, wherein the neural network is trained with a voice dataset and a background dataset, and wherein the neural network is configured to determine based on the voice dataset, the background dataset, and the extracted features from the first and second sound signals that the first and second sound signals original from the wearer of the wearable device.

Example 7 may include the subject matter of any of examples 1 or 4, further comprising a Fast Fourier Transform module to filter the first and second sound signals.

Example 8 may include the subject matter of any of examples 1 or 4, wherein the processor is configured to process the first sound signal and the second sound signal by splitting the first sound signal into a first set of subparts, the first set of subparts comprising a frame representing a portion in time of the first sound signal; splitting the second sound signal into a second set of subparts, the second set of subparts comprising a frame representing a portion in time of the second sound signal; combining a frame from the first set of subparts with a corresponding frame from the second set of subparts; and extracting a feature of the first and second sound signals based on combining the frame from the first set of subparts with the corresponding frame from the second set of subparts.

Example 9 may include the subject matter of example 1, wherein the wearable device comprises a head-worn device.

Example 10 is a method comprising receiving a first sound signal at a wearable device from a first microphone; receiving a second sound signal at the wearable device from a second microphone; determining that the first and second sound signals originate from the wearer of the wearable device.

Example 11 may include the subject matter of example 10, wherein the first microphone comprises an air microphone.

Example 12 may include the subject matter of any of examples 10 or 11, wherein the second microphone comprises one of a bone conduction microphone or an in-ear microphone.

Example 13 may include the subject matter of example 10, wherein processing the first sound signal and the second sound signal comprises sampling the first sound signal and the second sound signal; extracting one or more features from the first sound signal and from the second sound signal; and determining that the first and second sound signals originate from the wearer by comparing extracted features form the first sound signal and from the second sound signal.

Example 14 may include the subject matter of any of examples 10 or 13, further comprising processing the extracted features from each of the first sound signal and from the second sound signal using a neural network.

Example 15 may include the subject matter of example 14, wherein the neural network is trained with a voice dataset and a background dataset, and wherein the neural network is configured to determine based on the voice dataset, the background dataset, and the extracted features from the first and second sound signals that the first and second sound signals original from the wearer of the wearable device.

Example 16 may include the subject matter of any of examples 10 or 13, further comprising filtering the first and second sound signals using a Fast Fourier Transform module.

Example 17 may include the subject matter of any of examples 10 or 13, wherein processing the first sound signal and the second sound signal comprises splitting the first sound signal into a first set of subparts, the first set of subparts comprising a frame representing a portion in time of the first sound signal; splitting the second sound signal into a second set of subparts, the second set of subparts comprising a frame representing a portion in time of the second sound signal; combining a frame from the first set of subparts with a corresponding frame from the second set of subparts; and extracting a feature of the first and second sound signals based on combining the frame from the first set of subparts with the corresponding frame from the second set of subparts.

Example 18 is a computer program product tangibly embodied on a non-transient computer readable medium, the computer program product comprising instructions operable when executed to receive from a first microphone a first sound signal from a wearer of the wearable device receive from a second microphone a second sound signal from the wearer of the wearable device; and process the first sound signals and the second sound signals to determine that the first and second sound signals originate from the wearer of the wearable device.

Example 19 may include the subject matter of example 18, wherein the first microphone comprises an air microphone.

Example 20 may include the subject matter of any of examples 18 or 19, wherein the second microphone comprises one of a bone conduction microphone or an in-ear microphone.

Example 21 may include the subject matter of example 18, wherein the processor is configured to process the first sound signal and the second sound signal by sampling the first sound signal and the second sound signal; extracting one or more features from the first sound signal and from the second sound signal; and determining that the first and second sound signals originate from the wearer by comparing extracted features form the first sound signal and from the second sound signal.

Example 22 may include the subject matter of any of examples 18 or 21, further comprising a neural network to process extracted features from each of the first sound signal and from the second sound signal.

Example 23 may include the subject matter of example 22, wherein the neural network is trained with a voice dataset and a background dataset, and wherein the neural network is configured to determine based on the voice dataset, the background dataset, and the extracted features from the first and second sound signals that the first and second sound signals original from the wearer of the wearable device.

Example 24 may include the subject matter of any of examples 18 or 21, further comprising a Fast Fourier Transform module to filter the first and second sound signals.

Example 25 may include the subject matter of any of examples 18 or 21, wherein the processor is configured to process the first sound signal and the second sound signal by splitting the first sound signal into a first set of subparts, the first set of subparts comprising a frame representing a portion in time of the first sound signal; splitting the second sound signal into a second set of subparts, the second set of subparts comprising a frame representing a portion in time of the second sound signal; combining a frame from the first set of subparts with a corresponding frame from the second set of subparts; and extracting a feature of the first and second sound signals based on combining the frame from the first set of subparts with the corresponding frame from the second set of subparts.

Advantages of the present disclosure are readily apparent to those of skill in the art. Among the various advantages of the present disclosure include the following:

Aspects of the present disclosure can provide an enhanced user experience when using an interactive wearable device, such as a head-worn device, by using multiple microphones of different types of modes.

While this specification contains many specific implementation details, these should not be construed as limitations on the scope of any disclosures or of what may be claimed, but rather as descriptions of features specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A wearable device comprising:
a first microphone to receive a first sound signal;
a second microphone to receive a second sound signal;
a processor to process the first sound signal and the second sound signal to determine that the first sound signal and second sound signal originate from a wearer of the wearable device;
wherein the processor is to compare a first frequency band and a second frequency band from each of the first sound signal and the second sound signal, the second frequency band being higher than the first frequency band, and the processor is to determine that the first sound signal and the second sound signal originate from the wearer of the wearable device based on detecting a difference in frequencies of the first sound signal and the second sound signal within the first frequency band and detecting a correlation in the frequencies of the first sound signal and the second sound signal within the second frequency band.

2. The wearable device of claim 1, wherein the first microphone comprises an air microphone.

3. The wearable device of claim 1, wherein the second microphone comprises one of a bone conduction microphone or an in-ear microphone.

4. The wearable device of claim 1, wherein the processor is configured to process the first sound signal and the second sound signal by:
sampling the first sound signal and the second sound signal;
extracting one or more features from the first sound signal and from the second sound signal; and
determining that the first sound signal and the second sound signal originate from the wearer of the wearable device by comparing extracted features from the first sound signal and from the second sound signal.

5. The wearable device of claim 1, further comprising a neural network to process extracted features from each of the first sound signal and from the second sound signal.

6. The wearable device of claim 5, wherein the neural network is trained with a voice dataset and a background dataset, and wherein the neural network is configured to determine based on the voice dataset, the background dataset, and the extracted features from the first sound signal and the second sound signal that the first sound signal and the second sound signal original from the wearer of the wearable device.

7. The wearable device of claim 1, further comprising a Fast Fourier Transform module to filter the first sound signal and the second sound signal.

8. The wearable device of claim 1, wherein the processor is configured to process the first sound signal and the second sound signal by:
splitting the first sound signal into a first set of subparts, the first set of subparts comprising a frame representing a portion in time of the first sound signal;

splitting the second sound signal into a second set of subparts, the second set of subparts comprising a frame representing a portion in time of the second sound signal;

combining a frame from the first set of subparts with a corresponding frame from the second set of subparts; and extracting a feature of the first sound signal and the second sound signal based on combining the frame from the first set of subparts with the corresponding frame from the second set of subparts.

9. The wearable device of claim 1, wherein the wearable device comprises a head-worn device.

10. A method comprising:

receiving a first sound signal at a wearable device from a first microphone;

receiving a second sound signal at the wearable device from a second microphone;

determining that the first sound signal and second sound signal originate from a wearer of the wearable device;

wherein determining that the first sound signal and second sound signal original from the wearer of the wearable device comprises:

comparing a first frequency band and a second frequency band from each of the first sound signal and the second sound signal, the second frequency band being higher than the first frequency band; and determining that the first sound signal and the second sound signal originate from the wearer of the wearable device based on detecting a difference in frequencies of the first sound signal and the second sound signal within the first frequency band and that the frequencies of the first sound signal and the second sound signal correspond within and detecting a correlation in the frequencies of the first sound signal and the second sound signal within the second frequency band.

11. The method of claim 10, wherein the first microphone comprises an air microphone.

12. The method of claim 10, wherein the second microphone comprises one of a bone conduction microphone or an in-ear microphone.

13. The method of claim 10, wherein processing the first sound signal and the second sound signal comprises sampling the first sound signal and the second sound signal;

extracting one or more features from the first sound signal and from the second sound signal; and determining that the first sound signal and the second sound signal originate from the wearer of the wearable device by comparing extracted features from the first sound signal and from the second sound signal.

14. The method of claim 10, further comprising processing the extracted features from each of the first sound signal and from the second sound signal using a neural network.

15. The method of claim 14, wherein the neural network is trained with a voice dataset and a background dataset, and wherein the neural network is configured to determine based on the voice dataset, the background dataset, and the extracted features from the first second signal and second sound signal that the first second signal and second sound signal original from the wearer of the wearable device.

16. The method of claim 10, further comprising filtering the first sound signal and second sound signal using a Fast Fourier Transform module.

17. The method of claim 10, wherein processing the first sound signal and the second sound signal comprises:

splitting the first sound signal into a first set of subparts, the first set of subparts comprising a frame representing a portion in time of the first sound signal;

splitting the second sound signal into a second set of subparts, the second set of subparts comprising a frame representing a portion in time of the second sound signal;

combining a frame from the first set of subparts with a corresponding frame from the second set of subparts; and extracting a feature of the first sound signal and the second sound signal based on combining the frame from the first set of subparts with the corresponding frame from the second set of subparts.

18. A computer program product tangibly embodied on a non-transient computer readable medium, the computer program product comprising instructions operable when executed to:

receive from a first microphone a first sound signal;

receive from a second microphone a second sound signal;

process the first sound signal and the second sound signal to determine that the first sound signal and second sound signal originate from a wearer of the wearable device;

wherein the computer program product further comprises instructions operable when executed to:

compare a first frequency band and a second frequency band from each of the first sound signal and the second sound signal, the second frequency band being higher than the first frequency band; and determine that the first sound signal and the second sound signal originate from the wearer of the wearable device based on detecting a difference in frequencies of the first sound signal and the second sound signal within the first frequency band and detecting a correlation in the frequencies of the first sound signal and the second sound signal within the second frequency band.

19. The computer program product of claim 18, wherein the first microphone comprises an air microphone.

20. The computer program product of claim 18, wherein the second microphone comprises one of a bone conduction microphone or an in-ear microphone.

21. The computer program product of claim 18, further comprising instructions operable when executed to:

sample the first sound signal and the second sound signal;

extract one or more features from the first sound signal and from the second sound signal; and determine that the first sound signal and the second sound signal originate from the wearer of the wearable device by comparing extracted features from the first sound signal and from the second sound signal.

22. The computer program product of claim 18, further comprising a neural network to process extracted features from each of the first sound signal and from the second sound signal.

23. The computer program product of claim 22, wherein the neural network is trained with a voice dataset and a background dataset, and wherein the neural network is configured to determine based on the voice dataset, the background dataset, and the extracted features from the first sound signal and the second sound signal that the first sound signal and the second sound signal original from the wearer of the wearable device.

24. The computer program product of claim 18, further comprising instructions operable when executed to filter the first sound signal and the second sound signal based on a Fast Fourier Transform.

25. The computer program product of claim 18, further comprising instructions operable when executed to:
- splitting the first sound signal into a first set of subparts, the first set of subparts comprising a frame representing a portion in time of the first sound signal;
- splitting the second sound signal into a second set of subparts, the second set of subparts comprising a frame representing a portion in time of the second sound signal;
- combining a frame from the first set of subparts with a corresponding frame from the second set of subparts; and
- extracting a feature of the first sound signal and the second sound signal based on combining the frame from the first set of subparts with the corresponding frame from the second set of subparts.

* * * * *

UNITED STATES PATENT AND TRADEMARK OFFICE
CERTIFICATE OF CORRECTION

PATENT NO. : 9,978,397 B2
APPLICATION NO. : 14/978015
DATED : May 22, 2018
INVENTOR(S) : Swarnendu Kar, Gauri Phatak and Saurin S. Shah It is certified that error appears in the above-identified patent and that said Letters Patent is hereby corrected as shown below:

On the Title Page

In item (*), Column 1, Line 3, in Notice, after "0 days.", delete "days.".

In the Drawings

On sheet 4 of 4, in FIG. 4, Reference Numeral 416, Line 2, delete "probaility" and insert -- probability --, therefor.

Signed and Sealed this
Sixteenth Day of October, 2018

Andrei Iancu
*Director of the United States Patent and Trademark Office*